May 31, 1966  R. F. GOTTSACKER ETAL  3,254,177
TIMER AND TIMER CONTACTOR COMBINATION
Filed May 17, 1963 4 Sheets-Sheet 1

INVENTORS.
Raymond F. Gottsacker,
Erik J. Nielsen, &
Gordon F. Puetz,
by: John H. Leonard,
their ATTORNEY.

May 31, 1966 R. F. GOTTSACKER ETAL 3,254,177
TIMER AND TIMER CONTACTOR COMBINATION
Filed May 17, 1963 4 Sheets-Sheet 4
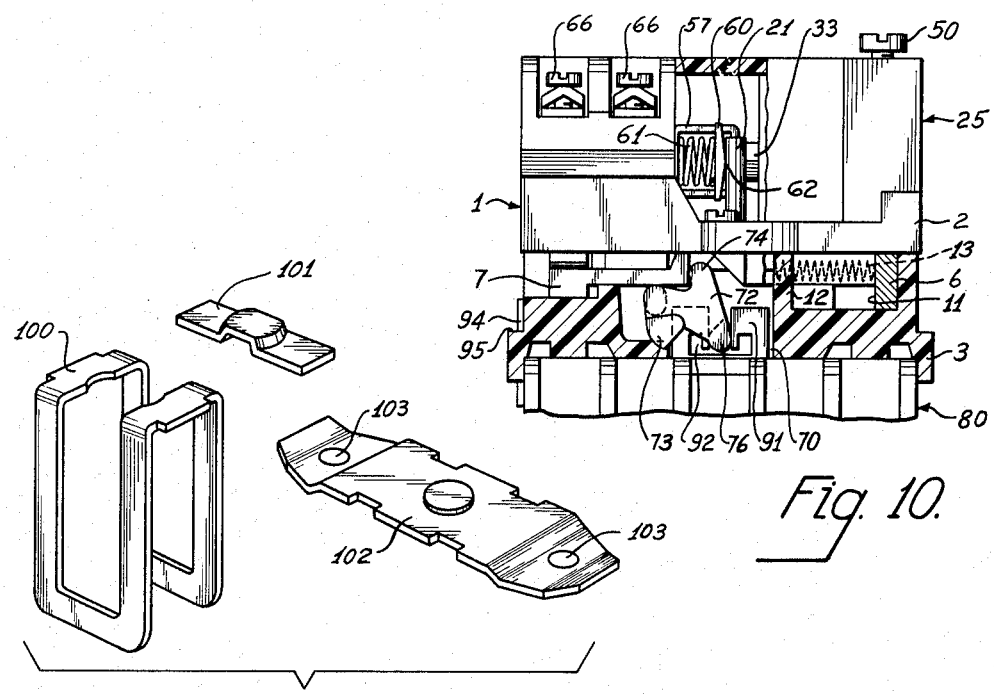
Fig. 10.
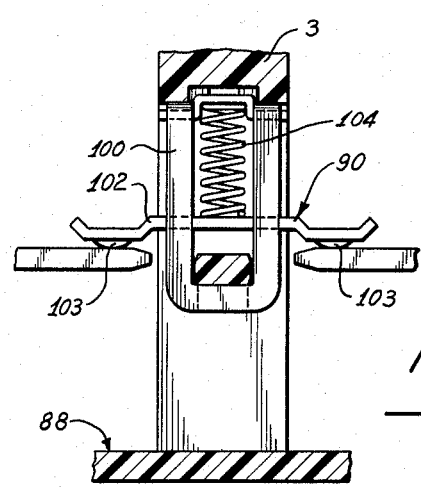
Fig. 11.
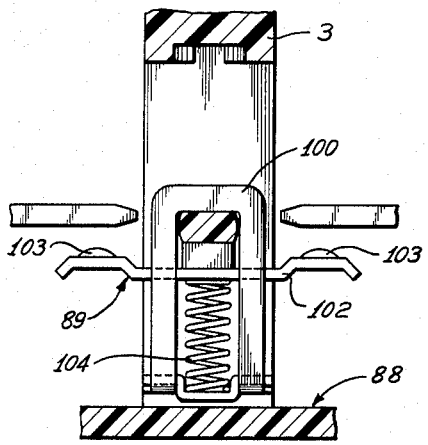
Fig. 12.
Fig. 13.
INVENTORS.
Raymond F. Gottsacker,
Erik J. Nielsen, &
Jordon F. Puetz,
by: John H. Leonard Jr.
ATTORNEY.

United States Patent Office 3,254,177
Patented May 31, 1966

3,254,177
TIMER AND TIMER CONTACTOR COMBINATION
Raymond F. Gottsacker, Edina, Minn., and Erik J. Nielsen, Mequon, and Jordan F. Puetz, Milwaukee, Wis., assignors to Square D Company, Park Ridge, Ill., a corporation of Michigan
Filed May 17, 1963, Ser. No. 281,277
15 Claims. (Cl. 200—97)

This invention relates to a timer and particularly to a timer or timing unit for use in connection with contactors, relays, systems interlock switches and the like. For the purposes of illustration herein, the timer is described as applied to an electromagnetic control relay of the general character described in the copending application of Hurter and Nielson, Serial No. 206,624, filed July 2, 1962, now Patent No. 3,215,800, issued November 2, 1965, and entitled, "Electromagnetic Relay and Contact Carrier Assembly Therefor," its use for other purposes being readily apparent from the illustrative example.

One of the principal objects of the present invention is to provide a timer which may be readily connected to a moving part of a device, such as a movable contact carrier of a contactor, and form therewith a compact and rugged structure.

Another object is to provide a timer and contactor combination wherein the timer may be mounted readily on a contactor in either of two positions selectively, in one of which positions it provides a time delay function after energization of the contactor and in the other of which positions it provides a time delay function after deenergization of the contactor.

More specifically, the invention relates to a timer which when placed on the upper end of a contactor housing in one position is operative for providing a time delay function therein after energization of the contactor and which, when rotated 180° about an upright axis from the one position and replaced on the upper end of the housing in the rotated position, becomes operative for providing a time delay function after deenergization of the contactor.

Another object is to provide a simple and effective timer and contactor combination in which the terminals of the contactor and the adjusting devices for the timing head are accessible from the top or front of the combination.

Another specific object is to provide a timer which employs a housing wherein is provided a horizontally movable slide which is connected to and controlled by the timer and which, by an oscillatable crank, is connectable to a movable member, such as a movable contact carrier, the crank being so arranged that the movement of the slide is horizontal and the forces transmitted between the crank and movable member are in a path substantially at right angles to the path of the slide.

Another object is to provide a timer attachment which may be installed on relays of the type described in the above identified application simply by removing the conventional cover on the relay, replacing it with the present structure or timer attachment, and then operating the cover clamps of the relay to clamp the timer attachment fixedly in operating position.

Other objects and advantages of the present invention will become apparent from the following description wherein reference is made to the drawings, in which:

FIG. 10 is a view similar to FIG. 2 with the timer rotated 180° from its position in FIG. 2, and with one of the two main return springs omitted, for changing the timing operation;

FIG. 11 is a perspective view showing the movable contact carrier and contact sub-assemblies for the carrier;

FIG. 12 is a fragmentary vertical sectional view of the contact carrier with a normally open contact installed therein; and FIG. 13 is a view similar to FIG. 12 but showing a normally closed contact installed in the carrier.

Figure 1:
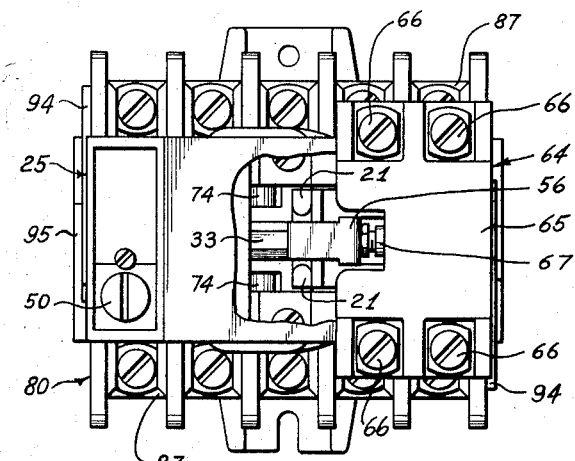
FIG. 1 is a top plan view of the timer assembly and contactor embodying the principles of the present invention, part of the cover of the timer assembly being broken away for clearness in illustration.

Referring to the drawing, the timer assembly comprises a timer housing or body 1 having a portion 2 resting on a slide housing 3, these housings being securely fastened together by suitable means such as the screws illustrated. The housings 2 and 3 preferably are of molded insulating material and are provided with horizontal guideways 4 and 5 at opposite ends, respectively. Supported on the guideways is a slide or slider 6 having a portion in the form of an extension 7 which operates in the guideway 5 and which is connected to the remainder of the slide by a suitable fastening means, such as the screw 8. Thus the slide as a whole is mounted in the housing 1 for sliding along a horizontal lineal path.

Figure 4:
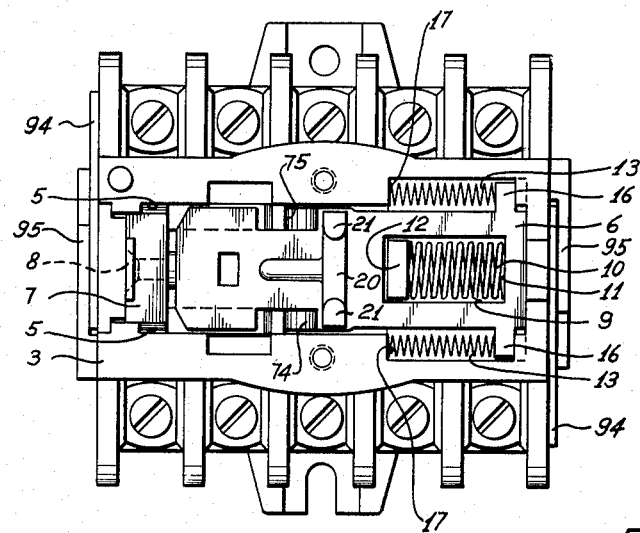
FIG. 4 is a top plan view similar to FIG. 1, but with the timer removed to expose the slide or slider of the timer assembly and means which interconnect the timer, slide, and movable contact carrier of the contactor, as viewed on the line 4—4 in FIG. 2.
Figure 5:
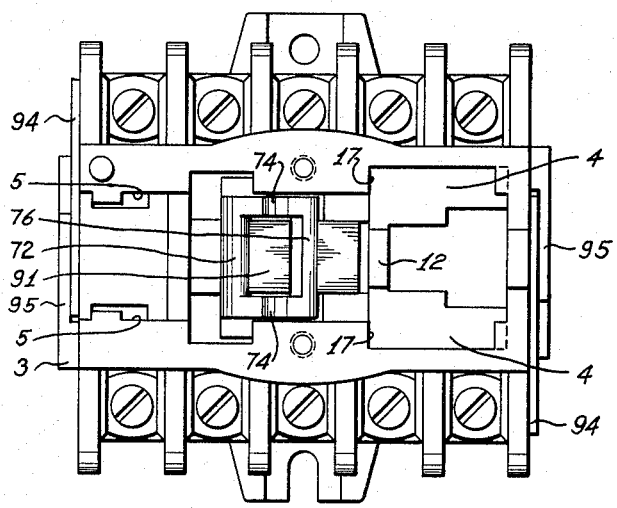
FIG. 5 is a view similar to FIG. 4 with the slide removed to show the rock lever for connecting the slide and the movable contact carrier of the contactor.
Figure 6:
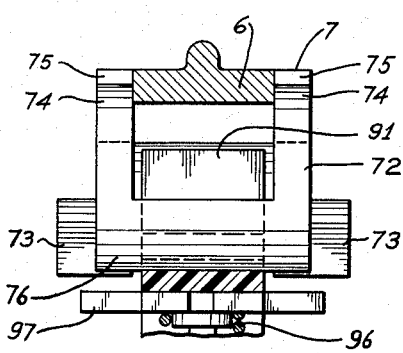
FIG. 6 is a vertical sectional view taken on the line 6—6 in FIG. 2.
Figure 7:
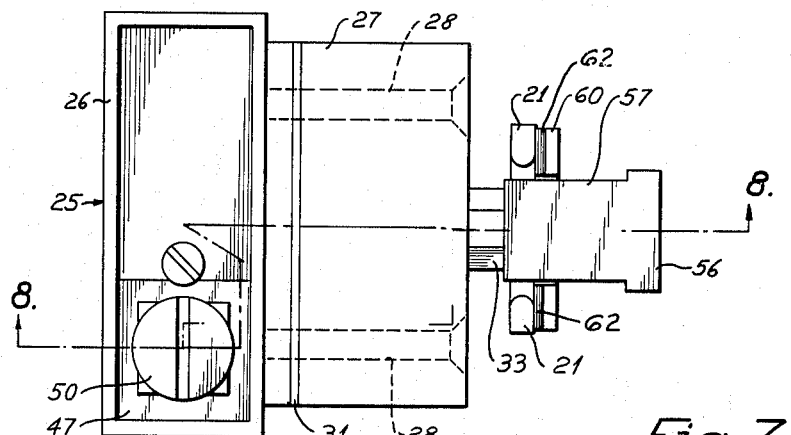
FIG. 7 is an enlarged top plan view of the timer with the contactor energized.

The slide has an opening 9 near one end in which is received a main return spring 10, the spring being in abutment at one end with a shoulder 11 on the slide and at the other end with an abutment 12 in, and rigid with, the housing or body 1. This spring urges the slide to a retracted position, as illustrated in FIG. 4.

For purposes later to be described, in addition to the spring 10, a pair of lighter springs 13 are provided for urging the slide into the retracted position. These springs preferably overlie the guideways 4. The slide 6 is provided with laterally outwardly extending ears 16 against which the springs 13 abut at one end, respectively. The other ends of the springs 13 engage shoulders 17, respectively, integral with the housing. Thus, all three springs urge the slide to retracted position. The slide is provided with an upstanding yoke portion 20 having two spaced yoke arms 21 for cooperation with a timer 25.

Figure 8:
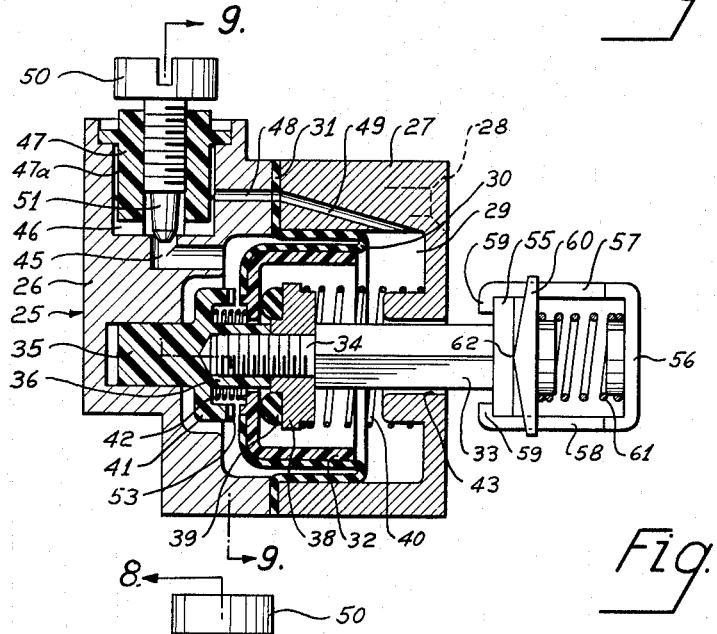
FIG. 8 is a vertical, longitudinal sectional view of the timer taken on the lines 8—8 in FIGS. 7 and 9, respectively.
Figure 9:
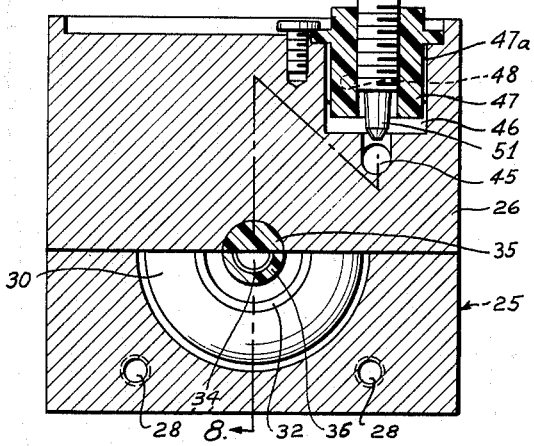
FIG. 9 is a vertical cross sectional view taken on the line 9—9 of FIG. 8.

The timer 25 is made as a separate unit which can readily be attached to or detached from the top portion 2 of the housing 1. As best illustrated in FIG. 8, the timer comprises a two part body composed of portions 26 and 27 secured together by suitable screws 28 and provide a cavity 29. Mounted in the cavity is a diaphragm and piston assemblage comprising a cup-shaped diaphragm 30 having a peripheral flange 31 which is gripped firmly between the adjacent end faces of the body portions 26 and 27 in sealing relation. Within the diaphragm is a piston 32 which is in the form of an open end cup with an axial aperture or passage in its bottom wall. An operating stem 33 of hexagonal cross section is slidably mounted for endwise movement in a bore in the body portion 27 in coaxial relation with the piston 32. The stem has a reduced threaded inner end portion 34 which extends through the piston and central portion of the diaphragm and carries a valve relief retainer 35. The retainer 35 is threadably secured to the reduced portion 34 by means of a sleeve portion 36 which extends through the center of the diaphragm 30 and piston 32 with slight radial clearance so that air can pass between the outer periphery of the sleeve portion 36 and the central passage of the diaphragm and piston.

Mounted in fixed axial position on the stem 33 is a poppet valve 38 having a resilient annular seat 39 which engages the inner face of the bottom wall of the piston 32 in sealing engagement about its central aperture. A return spring 40 is interposed between the end of the body portion 27 and the poppet valve 38 and normally urges the piston to the left in FIG. 8. The retainer 35 has a peripheral flange 41 adjacent to the diaphragm and which terminates in slightly spaced relation therefrom so that the diaphragm can move toward and away from the flange a slight distance. A seating spring 42 is interposed between the retainer 35 and the piston and normally urges the piston 32 against the seat 39 of the valve 38.

The body portion 27 has a hexagonal passage 43 the wall of which fits the stem 33 with slight radial clearance so as to permit the escape of air through the clearance space therebetween, but constrains the stem 33 from rotation about its axis.

The body portion 26 has a duct 45 which connects the cavity 29 at the side of the diaphrgam opposite the valve 38 with a bore or cavity 46. Mounted in the cavity 46 is a suitable insert 47 which is internally threaded to receive an adjusting screw later to be described. The insert in provided with ribs 47a so that air entering the cavity 46 can pass along the outside of the insert. Leading from the cavity 46 is a duct 48 which connects with a duct 49 in the body portion 27, a suitable port being provided in the diaphragm flange 31 at the juncture of the ducts 48 and 49 for placing them in communication with each other. The duct 49 connects with the portion of the cavity 29 in the body portion 27 at the valve side of the diaphragm.

It is apparent that with this arrangement, due to the spring 42, the piston is yieldably held in sealing engagement with the seat 39 of the valve 38. Consequently, as the stem 33 is moved to the left in FIG. 8, air cannot escape between the outer periphery of the sleeve portion 36 and the periphery of the central aperture through the piston 32 and diaphragm 30 as access thereto would be prevented by the seat 39 engaging the piston bottom wall. Consequently, as the piston moves to the left, air in the cavity in the body portion 26, to the side of the piston and diaphragm opposite the valve 38, is forced outwardly through the duct 45 into the cavity 46 and out of the cavity 46 through the ducts 48 and 49 into the cavity in the body portion 27 at the valve side of the diaphragm wherein it can escape between the valve stem 33 and the walls of the passage 43.

Mounted in the insert 47 is an adjusting screw 50 which is in threaded engagement therewith and has a tapered end 51 which enters the outlet of the bore 45 so as to adjust the rate at which the air can escape, depending on the axial position of the screw 50, and thus provide a predetermined adjustable time delay period.

On the other hand, though a time delay may be desired in this direction of movement, rapid movement of the stem 33 in the opposite direction is desirable. A sudden movement of the stem 33 to the right in FIG. 8 temporarily unseats valve 38 from the bottom wall of the piston 32, the spring 42 being compressed until the diaphragm is free from the valve 38 and bears against the peripheral edge of the flange 41 of the retainer 35. Passages 53, provided by scallops in the end margin of the flange 41, permit air to escape past the retainer and hence escape between the now unseated valve 38, and through the central apertures in the diaphragm and piston. The rate at which this air escapes in this manner is independent of the setting of the regulating screw 50.

In order to operate the timer by the slide, the stem 33 is provided with an enlarged head 55. A yoke 56 having arms 57 and 58 with inturned marginal flanges 59 is arranged so that the flanges engage beneath the head 55. A member 60 is yieldably pressed against this head by one end of a spring 61 of which the other end engages the opposite end of the yoke 56. The spring 61 thus urges the flanges 59 firmly against the underside of the head 55 and the member 60 firmly against the opposite face of the head. The member 60 has an abutment face 62 facing generally endwise of the member 33.

Figure 2:
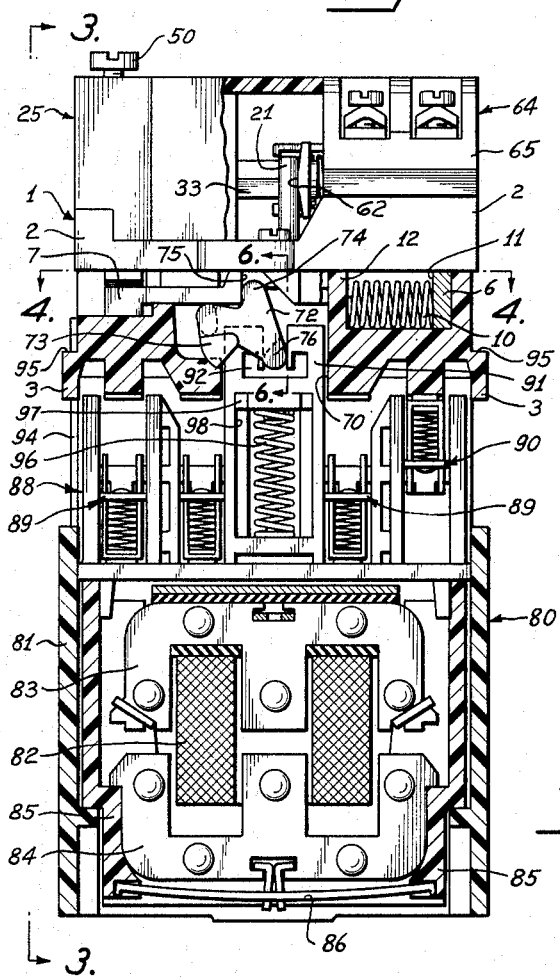
FIG. 2 is a front elevation, partly in section, of the timer assembly and contactor illustrated in FIG. 1.
Figure 3:
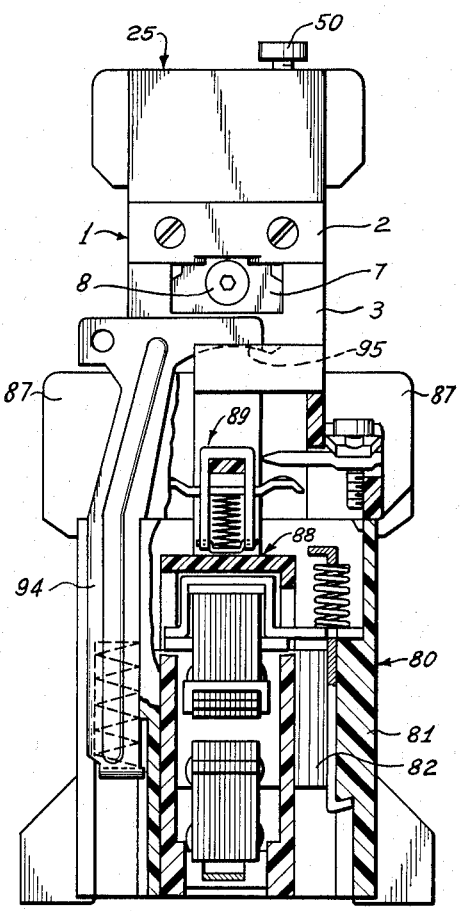
FIG. 3 is a left end elevation, partly in section, of the structure illustrated in FIGS. 1 and 2, viewed on the line 3—3 in FIG. 2.

The timer assembly also includes an interlock switch 64. As illustrated in FIGS. 1 through 3, the interlock switch 64 comprises a housing 65 on the housing top portion 2 in fixed position relative to the timer 25. The switch has externally accessible connectors 66, one pair of which is electrically interconnected when the switch is moved in one direction to one position and the other pair of which is electrically interconnected when the switch is moved in the opposite direction to another position. The specific details of the switch are unimportant except that the switch is a self-restoring dead center type snap switch. The switch 64 has an operating stem 67 which, when moved a predetermined distance axially in one direction snaps the switch into closed relation with one pair of contacts associated with the connectors 66. When it is released, the switch restores itself with snap action into closed position with another pair of contacts associated with the other pair of connectors 66. The specific details of the switch are secondary to the fact that it is so arranged that its stem 67 is engaged by the yoke 56 when the stem 33 moves to the right in FIG. 8, and is released when the stem 33 is moved to the left to retracted position.

The end of the yoke 56 outwardly from the body portion 27 engages the stem 67 and operates the switch, and due to the spring 61, a lost motion is provided for any over movement so as to not damage the switch.

As hereinbefore mentioned, it is desirable that the timer be adapted for ready connection to a piece of equipment, such as a contactor. For this purpose, as illustrated in FIG. 2, the body portion 3 has an opening 70 therein. A crank or rock lever 72 is mounted in the body portion 3 for rocking about an axis 73 and is exposed by the opening. The lever 72 has two fingers 74 which are engaged by a suitable shoulder 75 on the slide so that, as the slide is moved to retracted position by its springs 10 and 13, it rocks the lever 72 clockwise in FIG. 2, about the rocking axis of the rock lever. The lever is provided with a third finger 76 which is so positioned relative to the rocking axis 73 and the fingers 74 that as the fingers 74 are moved generally horizontally by the slide 6 as the slide moves toward retracted position, the finger 76 is moved downwardly substantially vertically an equal amount. The rock lever 72 is exposed by the opening 70 and provides an interconnecting means for transmitting operating forces between the timer slide and the moving part of the contactor which activates the timer.

In order to reduce the height and provide for a compact structure such as when the timer is used with electromagnetic relays and contactors having a vertically movable contact carrier, it is desirable that the horizontal movement of the slide be translated to vertical movement for cooperations with a vertically movable contact carrier.

It is to be noted that the yoke arms 21 of the slide 6 are always disposed between the body 25 and the member 60 in all operating positions of the timer.

As mentioned, it is desirable that the timer be usable in connection with a device such as the electromagnetic relay described in the above identified copending application. This relay, indicated generally at 80, comprises a molded hollow housing 81 in which is mounted an electromagnetic coil 82 and magnet or pole piece 83 which cooperate with an armature 84. The armature is mounted in a sliding guide 85 and held snugly in position therein by a spring 86. On the upper end of the housing 81 are mounted two stationary contact assemblies 87 which form a continuation of the housing 81 and which are readily detachable therefrom, as described in the above copending application. Carried on the top of the armature guide 85 for movement therewith and with the armature is a movable contact carrier 88 in which are a plurality of normally open contacts 89 and a plurality of normally closed contacts 90. The arrangement of the contacts is relatively unimportant, insofar as concerns this invention, and they can be rearranged for different normally open or normally closed operations, as desired, depending upon the operations to be controlled.

The contact carrier 88 is provided with an upstanding arm 91, which at its upper end, is provided with a transverse inverted T-slot 92 of which the leg opens outwardly through the top of the arm 91. The slot 92 is positioned so that when the housing portion 3, with the housing portion 2 and timer assembly assembled thereon, is clamped on top of the top part of the relay housing defined by the stationary contact assemblies 87, the slot 92 receives the finger 76 of the rocker 72 to provide an aperture connection between the rocker and carrier 88.

This connection is such that as the finger 76 moves downwardly, it moves the carrier in the downward direction. Referring to FIG. 2, it is apparent that with the parts arranged in the relative positions there illustrated, this downward movement is effected by the movement of the slide to the right to its retracted position by the return springs 10 and 13. This movement of the slide 6 causes its yoke arms 21 to pull the stem 33 to the right and thereby cause the stem 33 to push the yoke 56 against the stem 67 of the switch 64, thereby moving stem 67 to operate the switch out of its self-restored position.

During this operation, since air can escape around the valve 38 and between the diaphragm 30 and sleeve 36 to relieve any vacuum created in the cavity in the body portion 26, and can escape around the stem 33 through the passage 43, there is no time delay.

On the other hand, upon energization of the coil 82, the armature 84 is moved upwardly, thereby moving the carrier 88 upwardly. This forces the finger 76 upwardly, rocking the rocker 72 counterclockwise in FIG. 2, and thereby moving the slide 6 to the left against the resistance of its returns springs 10 and 13. This movement of the slide releases its yoke arms 21 from the member 60 whereupon the spring 40 of the timer forces the stem 33 to the left away from the stem 67 of the switch 64. However, this seats the valve 38 and air pressure is developed in the cavity in the body portion 26. This pressure can be relieved only by escape through the duct 45 of which the outlet port is controlled by the screw 50. Hence a time delay, the duration of which depends on the setting of the screw 50, resists movement of the stem 33 to the left. Since the stem 33, through the yoke 56 bears against the stem 67, this time delay is imposed on the switch 64, delaying the movement of the stem 67 to the left in FIG. 2 and thereby delaying the self-restoration of the switch. Thus in FIG. 2, the time delay is one occurring after energization of the relay coil.

As described in the above copending application, the relay is provided with spring biased clamps 94 which are adapted to clamp a cover on the relay. In the present instance, instead of clamping the cover on the upper end of the relay, as defined by the contact assemblies 87, the housing portion 3 is provided with clamping shoulders 95 which are positioned so that when the clamps 94 are operated, they engage the shoulder 95 and pull the portion 3, whereby, the entire timer assembly is pulled downwardly so that the housing portion 3 is held firmly in position on the upper end of the relay housing as defined by the removable contact assemblies 87.

In some cases it is desirable to provide a time delay after deenergization of the coil 82. For this purpose, the parts are repositioned as illustrated in FIG. 10. In this respect, it is to be noted that the bottom face of the housing portion 2 and top face of the housing portion 3 are symmetrical about a vertical central axis. These faces are shaped so that they fit each other not only in the position illustrated in FIG. 2 but also when the housing portion 2 is rotated 180° about the upright axis. Hence, by removing the portion 2, rotating it 180° about the axis, and reconnecting it on top of the housing portion 3, a time delay after deenergization is obtainable. In either rotated position, the yoke arms 21 must be disposed between the peak 62 of the member 60 and the timer body portion 27 for proper operation.

Referring again to FIG. 10, the rocker still is moved so that the finger 76 is moved downwardly when the slide 6 is moved to retracted position to the right by its springs 10 and 13. This movement releases the yoke arms 21 from the member 60 so that the stem 33 is moved to the right by the spring 40 against the air pressure in the cavity of the body portion 26, under the control of the screw 50. This imposes a time delay on the movement of the stem 67 in the self-restoring direction of the switch 64 after the coil 82 is denergized. On the other hand, upon energization of the coil 82, the finger 76 is moved upwardly, forcing the slide to the left in FIG. 10, against the resistance of springs 10 and 13. This pulls the stem 33 to the left, unseating the valve 38 and allowing immediate movement of the stem 33 toward the stem 67. Thus the stem 67 is moved without time delay out of self-restoring position upon energization of the coil 82, the reverse of the operations in FIG. 2.

Generally it is desirable that the movable carrier be returned to lowered position more positively than by gravity when the coil 82 is denergized. For this purpose a spring 96 is usually provided when a top cover is used as in the copending application. The spring 96 bears at its lower end on the carrier 88 and at its upper end on a holder 97 slidable vertically in a slot 98 in the arm 91. When the cover is fastened in place, it bears on the upper face of the holder 97 so that the spring 96 biases the carrier 88 downwardly.

However, when the timer assembly is substituted for the cover, the spring 96 may be removed as the return springs 10 and 13 of the slide 6 act to return the movable carrier after deenergization of the coil 82. If the spring 96 were retained under such conditions it would merely impose an additional and unnecessary load on the armature.

To further reduce the spring resistance on the armature, the spring 10 is removed when the time assembly is positioned for time delay after deenergization, as illustrated in FIG. 10. The reason for this is apparent from comparing the operating positions in FIGS. 2 and 10.

In the position shown in FIG. 2, the armature, upon energization of the coil 82, must overcome springs 10 and 13 only. The springs 10 and 13 only return the slide upon deenergization and must overcome the spring 40 of the timer and the resistance of the switch 64 to movement out of self-restored position.

In the position shown in FIG. 10, if the spring 10 were left in place, the armature, upon energization of the coil 82, would have to overcome not only springs 10 and 13, but also spring 40 and the resistance of the switch 64 to movement out of self-restored position. But springs 10 and 13 do not have to overcome the spring 40 upon return after deenergization of the coil 82. The springs 13 are adequate for return of the unopposed slide. Hence the spring 10 is removed so that the resistance to movement of the slide by the armature is limited to springs 13 and 40, thereby greatly reducing the burden on the armature.

As more fully described in the copending application, and as best illustrated in FIG. 11 through FIG. 13 hereof, the normally open contact 89 and normally closed contacts 90 are in the form of sub-assemblies, respectively. These assemblies are identical and are installed in different positions on the carrier 88 depending on whether a normally open contact or normally closed contact is desired. Each sub-assembly comprising a contact supporting frame 100 with a spring retainer 101 and contact bridge 102 having contact points 103. The retainer and bridge are disposed in the frame 100 with the spring 104 disposed therebetween. It is apparent that with this arrangement, the contact frames can be positioned on the carrier 88 so that the contacts are spring pressed upwardly for normally open contacts and spring pressed downwardly for normally closed contacts.

For convenience in description, the contractor and timer have been described as being in an upright position when positioned as illustrated in FIG. 2, it being understood that the terms "upright," "vertical" and "horizontal" are merely relative, as the entire combination is operative regardless of its physical position.

Having thus described our invention, we claim:

1. In combination, an electromagnetic contactor including an upright housing and a contact carrier mounted in the housing for movement upwardly and downwardly and having an operating arm exposed for access at the upper end of the housing;
    a timer housing having a lower end detachably receivable downwardly on the upper end of the contactor housing from a location thereabove in fitting relation thereto in one predetermined relatively rotated position of said housings about an upright axis;
    a timer in the timer housing and movable in opposite directions along a predetermined path;
    interconnecting means carried by the upright housing and movable in opposite directions and drivingly interconnecting the timer and said operating arm when said housings are in said fitting relation, said timer and interconnecting means being movable into and out of interconnected relation by moving the timer and its housing as a unit so that the housings are moved into and out of said fitting relation with respect to each other, respectively;
    fastening means detachably connecting the housings together in said fitting relation, said timer housing further being receivable from above the upright housing in a second fitting relation to the upper end of the upright housing when the housings are in a second position rotated relative to each other 180° about said upright axis from said first mentioned position, said interconnecting means drivingly interconnecting the timer and operating arm when the timer housing is so received in said second fitting relation.

2. A timer and electromagnetic contactor combination including an upright contactor housing, a contact carrier mounted in the housing for movement upwardly and downwardly, a slide mounted in the housing for movement substantially horizontally to and fro along a horizontal path, a rock lever connected to the slide and to the carrier for driving the slide horizontally by the carrier when the carrier moves upwardly, a timer mounted on top of the upright housing and having a part movable horizontally parallel to the path of the slide, means on the slide connected to the part for moving the parts in one direction when the slide is moved in one direction along its path, and return means for the slide and part, respectively, for returning each of them in opposite direction from that in which moved.

3. A structure according to claim 2 wherein the slide has an opening therethrough between its ends and positioned laterally of the slide inwardly from the sides, and said housing has a central shoulder extending into said opening, a return spring is interposed in the opening between the central shoulder and one end of the slide and urges the slide to one position along its path, and said return spring is detachably interposed between said central shoulder and said slide for ready removal.

4. A timer and electromagnetic contact combination including an upright contactor housing, a movable contact carrier mounted in the housing for movement in one direction and in an opposite direction along an upright path, selectively;
    a slide mounted in the housing for movement to and fro along a predetermined horizontal path;
    timing means movable along a path parallel to the slide path in opposite directions;
    drive means on the slide and connected to the timing means for movement of the timing means by the slide at least in one direction along the path of the timing means;
    means interconnecting the slide and carrier for driving the slide by the carrier and constraining them to movement in predetermined relation to each other;
    return means for the carrier;
    a switch connected to the timing means, and operated in one direction thereby consequent upon movement of the timing means in one of its said directions.

5. A structure according to claim 4 wherein restoring means are provided and are connected to the switch for returning the switch in an opposite direction, and the drive means are connected to the slide for release of the driving relation therewith when the slide moves in the opposite direction along its path.

6. A structure according to claim 5 wherein the timing means includes means to render the timing means operable to cause a time delay when moved in one of its said directions and to be free from time delay when moved in the other of its said directions, means interconnect the timing means and carrier for moving the timing means in said other of its directions by the slide when the carrier is moved in its said one direction, and for releasing the timing means for the slide when the carrier is moved in its opposite direction.

7. A structure according to claim 5 wherein the timing means includes means to render the timing means operable to cause a time delay when moved in one of its said directions and to be free from time delay when moved in the other of its said directions, means are provided for moving the timing means in said one direction by the slide when the carrier is moved in said one of its directions and for releasing the timing means from the slide when the carrier is moved in its opposite direction.

8. In combination,
    a switch body;
    a switch carried thereby and including a contact carrier movable to open and closed positions, respectively;
    a slide body member;
    a slide mounted in the slide body member for movement in a driven direction and in a return direction, respectively, relative thereto, along a predetermined path;
    means connecting the carrier and slide for moving the slide by the carrier in the driven direction to one position relative to the slide body member;
    means to return the slide in the return direction relative to the slide body member;
    a timer including a timer body member;
    said members being connectable to each other in two relative positions, selectively;
    said timer including a movable timer part;
    means connecting the part to the timer body member for movement from a normal returned position to a driven position relative to the timer body member in each of said relative positions of the members;
    means detachably connecting the members to the switch body in each of their said two relative positions, selectively;

connecting means on the slide detachably connecting the slide to the part, while the slide and part are in their returned positions, respectively, and the members are in one of said relative positions, for moving the part to its driven position by the slide when the slide is moved by the carrier in said driven direction of movement of the slide, and for holding the part in its driven position while the slide is in its said one position, and for releasing the part when the slide is returned to its returned position; and detachably connecting the slide to the part, while the slide is in its returned position and the part is in its driven position and the members are in their other relative position, for holding the part in its driven position and for releasing the part for return to its returned position when the slide is moved by the carrier to said one position of the slide.

9. A timer comprising a timer body portion, a timing device mounted therein and including timing means movable in opposite directions, respectively, a second body portion, a slide slidably mounted therein for movemetn along a predetermined path in opposite directions relative to the second body portion, means for connecting the body portions together in two different relative positions selectively, a switch connecting means connecting the slide to the timing means and to the switch, respectively, in one relative position of the body portions to cause one operation of the switch and timing means when the slide is moved in one of said directions relative to the body and to cause a second operation of the switch and timing means when the slide is moved in the other of said directions relative to the body along said path, and said connecting means connecting the slide to the timing means and to the switch, respectively in the other relative position of the body portions to cause a third operation of the switch and timing means when the slide is moved in said one of its directions along said path and to cause a fourth operation of the switch and timing means when the slide is moved in the other of said directions along said path.

10. A structure according to claim 9 wherein in said one operation the switch is moved to its normal position with a time delay, in the second operation, it is moved out of its normal position free from time delay, in the third operation, the switch is moved out of its normal position free from time delay, and in the fourth operation, the switch is moved to its normal position with time delay.

11. The structure according to claim 9 wherein the switch includes an operating stem means movable parallel to the slide path, and the connecting means includes a member movable with the slide along the slide path.

12. The structure according to claim 9 wherein the switch includes an operating stem means movable at substantially right angles to the slide path, and the connecting means include a member movable with the slide along said slide path and connectable to the timing means, a force translating member interconnecting the slide and switch operating stem means and having one part connected to the slide for movement thereby generally parallel to the slide path and having another part which is movable in a path at substantially right angles to the slide path when the first part is moved by the slide, and which is drivingly connected to the operating stem means.

13. The structure according to claim 8 wherein said relative positions of the body members are positions in which the body members are rotated 180° relative to each other about a common axis which is substantially normal to the slide path and extends in a direction from the path toward the timer body member; and the timer body member is movable generally parallel to said axis toward and away from the slide body member into and out of position for said connection of the members in said rotated positions, selectively.

14. The structure according to claim 13 wherein the movable timer part is movable parallel to the slide path;

said connecting means which detachably connect the slide and part include abutment means on the slide and part, respectively, which face generally endwise of the slide path and are interengageable with each other by movement of the body members toward each other generally endwise of said axis into said position for connection in said rotated positions, respectively, and which are disengageable from each other by movement of the body members away from each other generally endwise of said axis in said rotated positions, respectively.

15. The structure according to claim 14 wherein said timer part extends endwise parallel to said slide path and is movable endwise, the abutment means on the part has an abutment face facing in one direction endwise of said part, the abutment means on the slide comprise a pair of arms which are in fixed position on the slide and are spaced apart from each other transversely of the slide path and extend generally parallel to said axis for receiving the timer part therebetween by movement of the part in a direction from the outer ends of the arms toward the slide as the timer body member is moved to position for said connection; said pair of arms having one face facing in one direction endwise of said path and another face facing in the opposite direction endwise of the path;

said faces of said pair of arms being arranged for engagement of one of them with the abutment face of the part in one of said rotated positions of the timer body member and for engagement of the other one of said faces of the pair of arms with the abutment face of the part in the other rotated position of the timer body member.

References Cited by the Examiner
UNITED STATES PATENTS

| 2,414,305 | 12/1943 | Hulbert | 200—97 |
| 2,891,121 | 6/1959 | Date | 200—89 |
| 3,019,317 | 1/1962 | Gauvreau | 200—97 |
| 3,098,909 | 7/1963 | Scheib | 200—104 |

BERNARD A. GILHEANY, *Primary Examiner.*

ROBERT K. SCHAEFER, *Examiner.*

THOMAS D. MACBLAIN, *Assistant Examiner.*